United States Patent [19]

Verbicky, Jr. et al.

[11] Patent Number: 4,774,317

[45] Date of Patent: Sep. 27, 1988

[54] POLYETHERIMIDES AND METHOD FOR MAKING

[75] Inventors: John W. Verbicky, Jr., Scotia; Elbridge A. O'Neil, Port Henry, both of N.Y.

[73] Assignee: General Electric Company, Schenectady, N.Y.

[21] Appl. No.: 920,630

[22] Filed: Oct. 20, 1986

[51] Int. Cl.$^4$ .............................................. C08G 63/06
[52] U.S. Cl. .................................... 528/208; 528/125; 528/126; 528/128; 528/172; 528/352; 528/353
[58] Field of Search ............... 528/208, 125, 126, 128, 528/172, 352, 353

[56] References Cited

U.S. PATENT DOCUMENTS

| | | | |
|---|---|---|---|
| 3,200,152 | 8/1965 | Rupport et al. | 568/631 |
| 3,365,347 | 10/1966 | Lund et al. | 250/206 |
| 3,847,867 | 11/1974 | Heath et al. | 528/128 |
| 4,550,156 | 10/1985 | Gallagher | 528/353 |

Primary Examiner—John Kight
Assistant Examiner—M. L. Moore
Attorney, Agent, or Firm—William A. Teoli; James C. Davis, Jr.; James Magee, Jr.

[57] ABSTRACT

Polyetherimides are provided having chemically combined alkylaryl diamine units and method for making. The polyetherimides have similar $T_g$'s over broad mol percent ranges to polyetherimides made from phenylene diamine units while providing economic cost advantages during manufacture.

8 Claims, No Drawings

POLYETHERIMIDES AND METHOD FOR MAKING

BACKGROUND OF THE INVENTION

Prior to the present invention, polyetherimides were made by effecting reaction between certain aromatic bis(etheranhydride)s and organic diamines as shown by U.S. Pat. No. 3,847,867 (Heath et al.) assigned to the same assignee as the present invention and incorporated herein by reference. Although valuable injection moldable high-performance thermoplastic materials can be made in accordance with the method of Heath et al., new techniques are constantly being developed to further improve the properties of injection-moldable thermoplastics as well as the methods for making such materials.

The present invention is based on the discovery that certain alkylaryl amines having the formula,

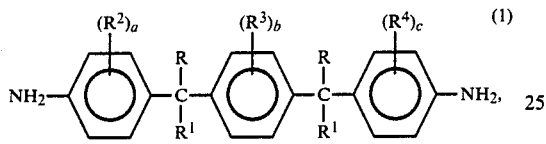

referred to hereinafter as "DIBDA", where R and $R^1$ are selected from hydrogen, $C_{(1-3)}$ alkyl radicals, or a mixture thereof, $R^2$, $R^3$ and $R^4$ are selected from halogen, $C_{(1-8)}$ alkyl and $C_{(1-8)}$ alkoxy and mixtures thereof, and a, b and c are whole numbers equal to 0 to 3 inclusive, can be intercondensed with aromatic bis(etheranhydride) having the formula,

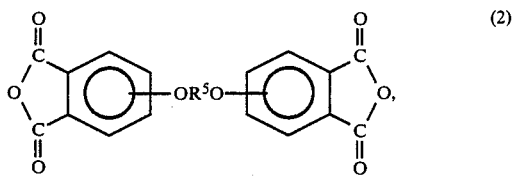

which preferably includes 2,2-bis[4-(3,4-dicarboxyphenoxy)phenyl]propane dianhydride, referred to hereinafter as "BPADA" to produce an injection-moldable high performance polyetherimide having a substantially uniform glass transition temperature, as compared to polyetherimide made in accordance with the teaching of the above-mentioned Heath et al. patent, where $R^5$ is selected from $C_{(6-30)}$ divalent aromatic organic radicals. For example, it has been found that the condensation of BPADA with DIBDA, or a mixture of DIBDA with a different organic diamine, such as m-phenylene diamine "MPD", over broad mole percent ranges, results in the production of polyetherimide having substantially the same 217°-220° C. $T_g$ as BPADA-MPD polyetherimide. Advantageously, the mechanical properties of the resulting polyetherimides also have been found to remain relatively constant. In addition, substitution of DIBDA for the more costly MPD has provided significant reductions in the costs for making such polyetherimides.

STATEMENT OF THE INVENTION

There is provided by the present invention, polyetherimide consisting essentially of chemically combined units of the formula,

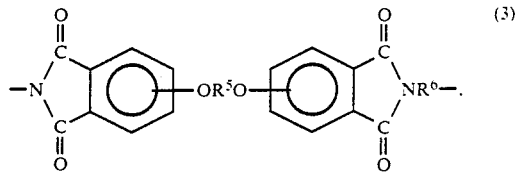

where $R^6$ is a divalent radical having the formula,

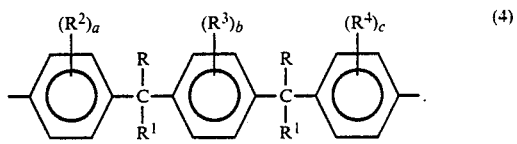

and R-$R^5$, and a, b, and c are as previously defined.

There is also provided by the present invention, a method for making polyetherimide consisting essentially of chemically combined units of Formula (3), which comprises (1) effecting reaction in the presence of an organic solvent at a temperature preferably in the range of from about 80° C. to 220° C. between substantially equimolar amounts of aromatic bis(etheranhydride) of Formula (2) and organic diamine selected from the class consisting of organic diamine of formula (1), and a mixture of such organic diamine and up to 25 mole percent of organic diamine of the formula, $$NH_2R^7NH_2, \quad (5)$$

and (2) recovering such polyetherimide from the resulting mixture of (1), where $R^7$ is is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxanes and divalent radicals of the general formula,

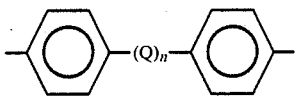

Q is a member selected from the class consisting of

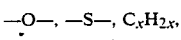

x is an integer from 1 to 5 and n is 0 or 1.

Monovalent radicals included within R and $R^1$ are, for example, hydrogen, $C_{(1-8)}$-alkyl radicals, such as methyl, ethyl, propyl, butyl. Radicals included within $R^5$ are, for example,

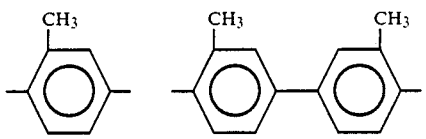

-continued

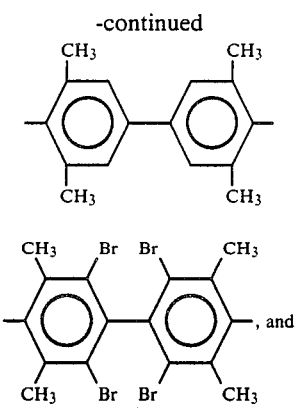

, and

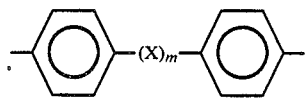

and (b) divalent organic radicals of the general formula

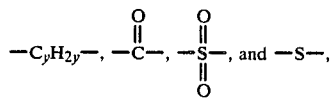

where X is a member selected from the class consisting of divalent radicals of the formulas, $$-C_yH_{2y}-, \quad -\overset{\overset{O}{\|}}{C}-, \quad -\overset{\overset{O}{\|}}{\underset{\underset{O}{\|}}{S}}-, \text{ and } -S-,$$

where m is 0 or 1, y is a whole number from 1 to 5, and the divalent bonds of the —O—R$^5$—O— radical are equally situated on the phthalic anhydride end groups, e.g., in the 3,3'-positions or the 4,4'-positions. Radicals included within R$^6$ are, for example, divalent radicals shown by formula (4) where R and R$^1$ are as previously defined and a mixture of such radicals and R$^7$ radicals such as arylene radicals, for example, phenylene, toluene, vinylene, and preferably 1,3-phenylene.

Some of the dianhydrides which are included in formula (2) are, for example, 2,2-bis[4-(2,3-dicarboxyphenoxy)phenyl]propane dianhydride, 2,2-bis[4-(3,4-dicarboxyphenoxy)phenyl]propane dianhydride and aromatic bisetheranhydride having the formula,

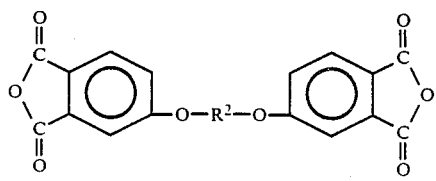

-continued

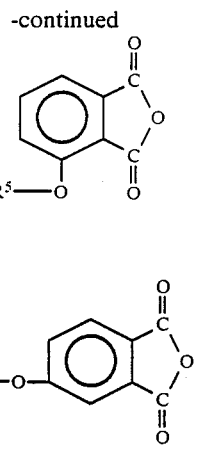

where R$^5$ is as previously defined.

There are included within the alkylaryl amines of formula (1) compounds such as
1,4-bis(p-amino-p-methylenephenylenebenzene),
1,4-bis(p-amino-p-ethylenephenylenebenzene),
1,4-bis(p-amino-p-isobutylenephenylenebenzene), and
1,4-bis(p-amino-p-isopropylidenephenylenebenzene).

Alkylaryl amines of formula (1) can be made by the procedure of Ruppert et al., U.S. Pat. No. 3,200,152 and Lund et al., U.S. Pat. No. 3,365,347.

Among the organic diamines of formula (5) there are included,
m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminoaphthalene;
3,3'-dimethylbenzidine;
3,3'-dimethoxybenzidine;
2,4-diaminotoluene; 2,6-diaminotoluene;
2,4-bis($\beta$-amino-t-butyl)toluene;
bis-(p-$\beta$-methyl-o-aminopentyl)benzene;
1,3-diamino-4-isopropylbenzene;
1,2-bis(3-aminopropoxy)ethane;
m-xylylenediamine;
p-xylylenediamine;
bis(4-aminocyclohexyl)methane;
decamethylenediamine;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine; 2,4-diaminotoluene;
nonamethylenediamine; 2,6-diaminotoluene;

bis-(3-aminopropyl)tetramethyldisiloxane, etc.

In the practice of the present invention, the polyetherimides consisting essentially of chemically combined units of formula (3) can be made by either effecting intercondensation between DIBDA and BPADA in the presence of an organic solvent with stirring at a temperature in the range of from 50° C. to 300° C., or under neat polymerization conditions in the absence of an organic solvent at temperature of 240° C. to 350° C. in an extruder reactor or similar device, such as shown by Schmidt et al., U.S. Pat. No. 4,443,159, assigned to the same assignee as the present invention and incorporated herein by reference.

Suitable organic solvents which can be used in the

After water evolution had ceased, the mixture was heated at reflux for an additional four hours. The mixture was then allowed to cool to room temperature (27° C.) and diluted with 200 ml of methylene chloride. The mixture was then added to 2500 ml of methanol resulting in the precipitation of a fluffy white powder. The powder was redissolved in 300 ml of methylene chloride and reprecipitated in 2500 ml of methanol. The product was then dried in vacuo at 130° C. for 72 hours. The intrinsic viscosity of the product was 0.452 in chloroform. The glass transition temperature of the product was 220° C. Based on method of preparation, the product was a polyetherimide consisting essentially of chemically combined units of the formula,

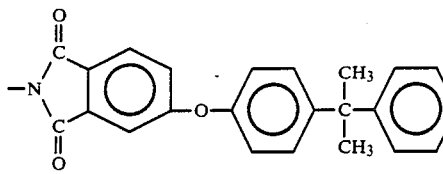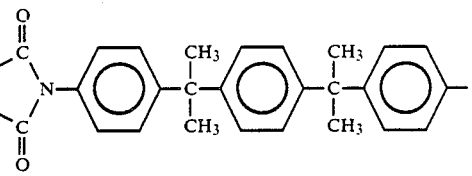

practice of the present invention are, for example, o-dichlorobenzene, dimethylsulfoxide, dimethylacetamide, and dimethylformamide.

There are also can be utilized in the practice of the method of the present invention, various ingredients such as chain stoppers, for example, phthalic anhydride, if desired to control the molecular weight of the polyetherimide. It is preferred to conduct the intercondensation reaction in a nonoxidizing atmosphere such as under a nitrogen atmosphere to minimize undue oxidation of the polymer.

Polyetherimides consisting essentially of formula (3) units can be reinforced with various particulated fillers such as glass fibers, silica fillers, carbon whiskers, up to 50% by weight of the resulting total blend. Reinforcement of polymer can be accomplished prior to polymer formation by effecting polymerization in the presence of filler. Melt blending and solution blending also can be employed.

In order that those skilled in the art will be able to practice the invention, the following examples are given by way of illustration and not by way of limitation. All parts are by weight.

EXAMPLE

There was added at room temperature under substantially anhydrous conditions 145 gm (0.747 mol) of 1,4-bis(2-hydroxy-2-propane)benzene (p-diol) to a mixture of 918 gm (9.87 mole) of freshly distilled aniline, and 45 gm of Super Filtrol #13 (acidic clay) which had been azeotropically dried. The mixture was heated to reflux under $N_2$ for three hours. The mixture was cooled to 100° C. and the catalyst was filtered. Excess aniline was vacuum distilled and the resulting crude product was steam stripped. Recrystallization from 8 liters of isopropanol provided 164 gm (64%) yield of 1,4-bis(p-amino, p-isopropylydenephenylene)benzene (DIBDA).

A solution of 21.99 grams (0.042 moles) of 2,2-bis[4-(3,4-dicarboxyphenoxy)phenyl]propane dianhydride (BPADA), 15 grams (0.043 moles) of DIBDA and 0.387 grams (0.0026 moles) of phthalic anhydride in 88 grams of 0-dichlorobenzene were heated to reflux under a nitrogen atmosphere. The reaction was carried out in the presence of 0.008 grams of sodium phenylphosphonate. A solution was refluxed with the removal of water by means of a trap to complete the polymerization.

The same procedure was substantially followed except that in place of DIBDA there was made a commercially available polyetherimide resulting from the intercondensation of BPADA and metaphenylene diamine (MPD) under neat conditions. The comparison of the two polymers was made as shown in the following table:

|  | Izod Impact | | Tg |
| --- | --- | --- | --- |
|  | Notched (⅛") | Unnotched (⅛") |  |
| DIBDA | 1 | 11 | 220° C. |
| MPD | 1 | 25 | 217° C. |

Additional polymers were prepared following the above procedure utilizing mixtures of DIBDA and MPD ranging from 25, 50 and 75 mole percent of DIBDA. It was found that the resulting polyetherimides had substantially the same $T_g$'s as shown for 100% DIBDA. This shows that the polyetherimides of the present invention are equivalent to prior art polyetherimide with respect to $T_g$'s, while in addition offering significant cost advantages in the manufacture of such polyetherimides.

Although the above examples are directed to only a few of the very many variables which can be utilized in the practice of the method of the present invention, it should be understood that a much broader variety of polyetherimides can be obtained utilizing organic dianhydrides and organic diamines as shown in the description preceding these examples.

What is claimed and sought to be protected by Letters Patent of the United States is as follows:

1. Polyetherimide consisting essentially of chemically combined units of the formula,

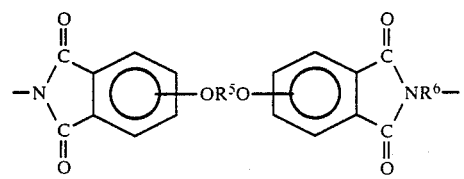

where $R^5$ is selected from $C_{(6-30)}$ divalent aromatic organic radicals, $R^6$ is selected from a divalent radical having the formula,

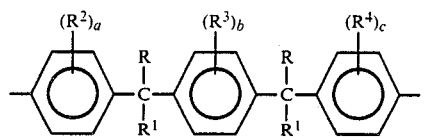

and a mixture thereof with $R^7$ radicals selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxanes and divalent radicals of the general formula

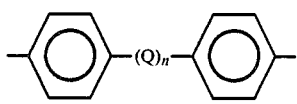

Q is a member selected from the class consisting of

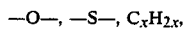

x is an integer from 1 to 5 and n is 0 or 1, R and $R^1$ are selected from hydrogen $C_{(1-3)}$ alkyl radicals, or a mixture thereof, $R^2$, $R^3$, and $R^4$ are selected from halogen, $C_{(1-8)}$ alkyl and $C_{(1-8)}$ alkoxy and mixtures thereof, and a, b, c are whole numbers equal to 0 to 3, inclusive.

2. Polyetherimides in accordance with claim 1, where $R^5$ is

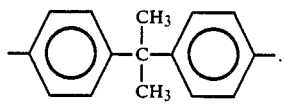

3. Polyetherimides in accordance with claim 1, where $R^6$ is

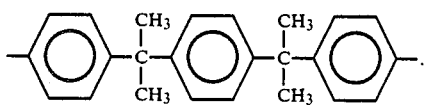

4. Polyetherimides in accordance with claim 1, where $R^6$ is a mixture

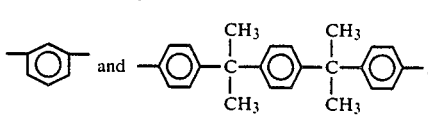

5. A method for making polyetherimide consisting essentially of chemically combined units of the formula,

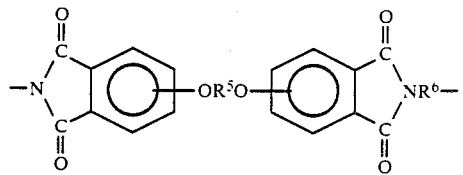

(1) which comprises effecting reaction in the presence of an organic solvent at a temperature preferably in the range of from 80° C. to 220° C. between substantially equimolar amounts of aromatic bis(etheranhydride) of the formula,

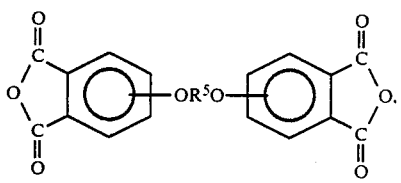

and organic diamine selected from the class consisting of alkylaryl diamine having the formula,

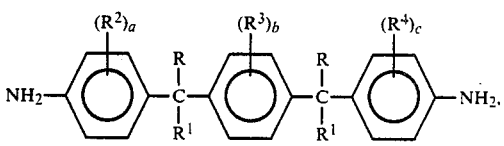

and a mixture thereof with organic diamine of the formula, $NH_2R^7NH_2$, (2) recovering such polyetherimide from (1) where R and $R^1$ are selected from hydrogen $C_{(1-3)}$ alkyl radicals, or a mixture thereof, $R^5$ is $C_{(6-30)}$ divalent aromatic organic radical, $R^6$ is

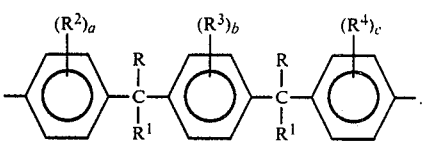

$R^7$ is is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxanes and divalent radicals of the general formula,

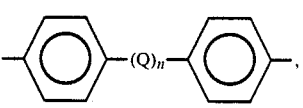

Q is a member selected from the class consisting of

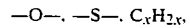

x is an integer from 1 to 5, and n is 0 or 1, $R^2$, $R^3$ and $R^4$ are selected from halogen, $C_{(1-8)}$ alkyl and $C_{(1-8)}$ alkoxy and mixtures thereof, and a, b and c are whole numbers equal to 0 to 3 inclusive, and $R^2$, $R^3$, and $R^4$ are selected from halogen, $C_{(1-8)}$ alkyl and $C_{(1-8)}$ alkoxy and mixtures thereof.

6. A method in accordance with claim 5, where the alkylaryl diamine is 1,4-bis(p-amino, p-isopropylidenephenylene)benzene.

7. A method in accordance with claim 5, where the organic diamine is metaphenylene diamine.

8. A method in accordance with claim 5, where the aromatic bis(etheranhydride) is 2,2-bis[4-(3,4-dicarboxyphenoxy)phenylpropane dianhydride.

* * * * *